No. 792,573. PATENTED JUNE 13, 1905.
J. F. DURYEA.
MOTOR VEHICLE.
APPLICATION FILED MAR. 27, 1900.

2 SHEETS—SHEET 1.

Witnesses:
Samuel W. Balch
W. Myron Reynolds

Inventor
J. Frank Duryea
by Thomas Ewing Jr.,
Attorney.

No. 792,573. PATENTED JUNE 13, 1905.
J. F. DURYEA.
MOTOR VEHICLE.
APPLICATION FILED MAR. 27, 1900.

2 SHEETS—SHEET 2.

Witnesses:
Samuel W. Balch
Hugh H. Senior

Inventor,
J. Frank Duryea
By Thomas Ewing, Jr.,
Attorney.

No. 792,573. Patented June 13, 1905.

UNITED STATES PATENT OFFICE.

JAMES FRANK DURYEA, OF SPRINGFIELD, MASSACHUSETTS.

MOTOR-VEHICLE.

SPECIFICATION forming part of Letters Patent No. 792,573, dated June 13, 1905.

Application filed March 27, 1900. Serial No. 10,311.

*To all whom it may concern:*

Be it known that I, JAMES FRANK DURYEA, a citizen of the United States of America, and a resident of Springfield, county of Hampden, State of Massachusetts, have invented certain new and useful Improvements in Motor-Vehicles, of which the following is a specification.

This invention has for its object the improvement of various details in the construction of carriages and other vehicles the power for which is self-contained.

The improvements, as more particularly hereinafter claimed, relate to the gas-engine-starting apparatus, located above the vehicle, so that it can be operated by a person seated in the vehicle.

Figure 1:
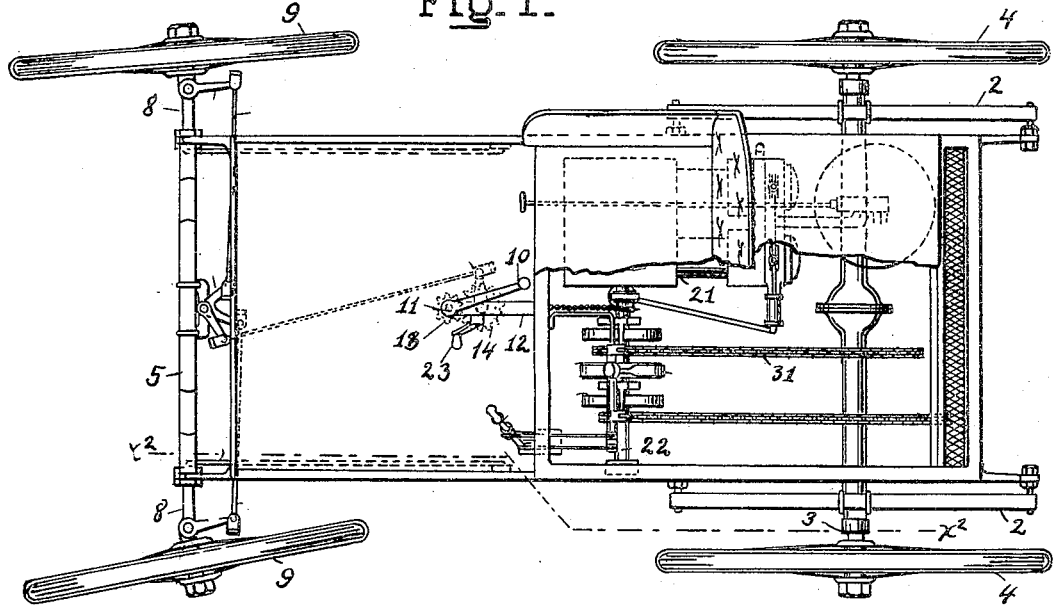
Figure 2:
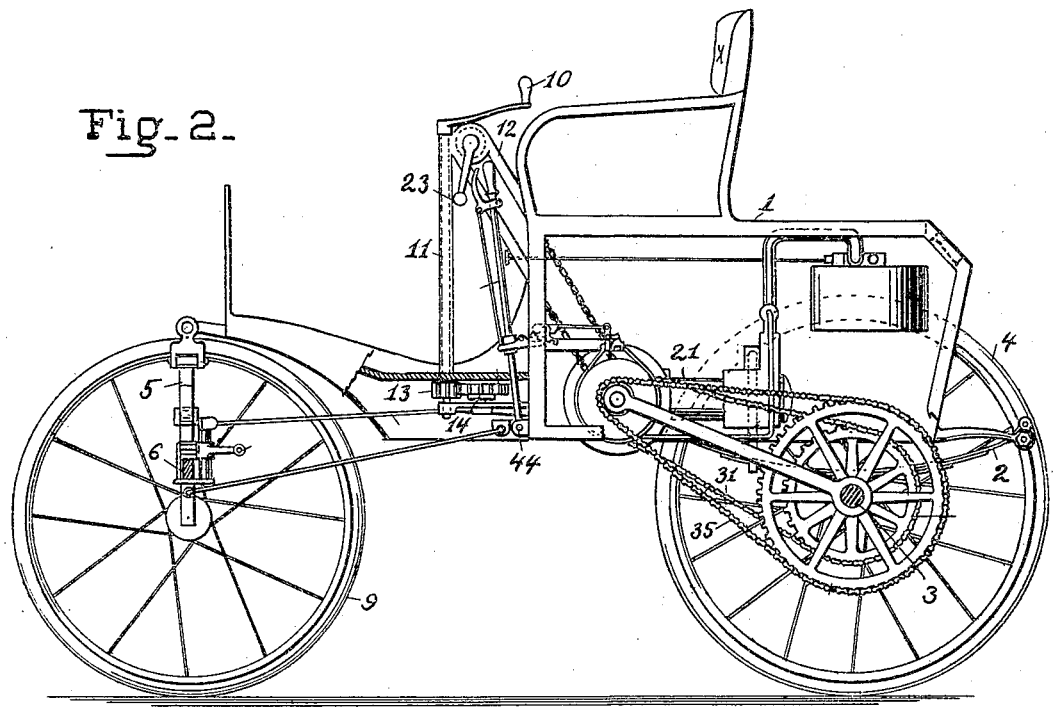
Figure 3:
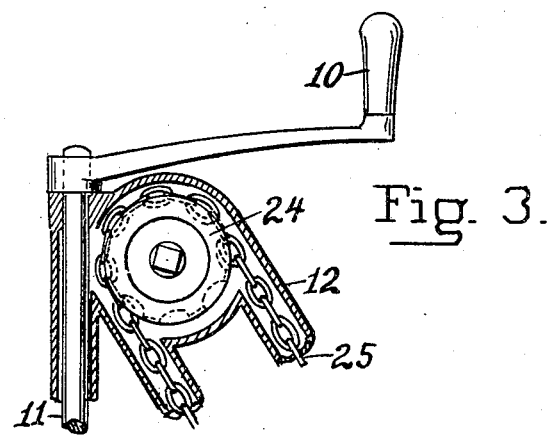
Figure 4:
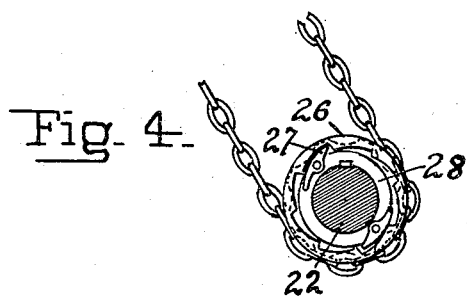

In the accompanying drawings, which form a part of this specification, Figure 1 is a top view, partly broken away, of a motor-vehicle embodying my invention. Fig. 2 is a side view, partly broken away, on the line $x^2$ $x^2$ of Fig. 1. Fig. 3 is a section through the bracket for the upper end of the steering-shaft and for the starting mechanism. Fig. 4 is a section through the engine-shaft on the line $x^{13}$ $x^{13}$ of Fig. 8, showing the ratchet connection for the chain-wheel of the starting mechanism on the engine-shaft.

The power mechanism for the motor-vehicle or automobile is inclosed in the vehicle-body 1. The vehicle-body is supported at the rear through springs 2 on the rear axle 3, which is the driving-axle. The rear running-wheels 4 are secured at the ends of this axle. At its forward end the vehicle-body is supported through a spring 5, which rests on a forward axle 6, which is jointed near its ends through vertical hinge-joints. The jointed ends 8 carry the forward running-wheels 9. The vehicle is steered by swinging the jointed ends of the axle in a horizontal plane about the hinge-joints. The steering mechanism consists of a steering-handle 10, mounted on the upper end of a vertical steering-shaft 11, which is supported on a tubular bracket 12 and projects up through the vehicle-body, so as to bring the handle within easy reach of a person seated in the vehicle. On the lower end of the steering-shaft is a spur-pinion 13, which is in engagement with a spur-gear 14. This spur-gear is connected with the jointed ends of the forward axle in any suitable manner.

The motor for running the vehicle is a gas-engine 21. Since gas-engines are not self-starting, a starting mechanism is provided for the hand rotation of the engine-shaft 22. The gas-engine is of course located in or beneath the vehicle-body; but the starting mechanism should be located above the vehicle-body, where it can be conveniently reached from the seat of the vehicle, and suitable connection between it and the engine-shaft must be provided. This starting mechanism is a crank 23, connected with a chain-wheel 24, mounted in the steering-head bracket above the vehicle-body, which bracket thus supports both the steering-shaft and the starting mechanism. A chain 25 runs over this wheel and over a chain-wheel 26 on the engine-shaft and through the tubular bracket, by which it is protected. This engine-shaft is connected to chain-wheel 26 through pawls 27, which are pivoted to a collar 28. The pawls engage with ratchet-teeth inside the rim of the chain-wheel 26. The bracket incases the chain.

Having thus described my invention, what I claim, and desire to secure by Letters Patent of the United States, is—

1. In a motor-vehicle the combination of a gas-engine and a shaft therefor, a starting mechanism consisting of a chain-wheel and means for rotating it, a chain-wheel on the engine-shaft, a chain connecting the wheels, and a bracket for supporting the first-named chain-wheel and incasing the chain, substantially as described.

2. In a motor-vehicle, the combination of a gas-engine and shaft therefor, a steering-shaft and means connected therewith for steering the vehicle, a starting mechanism consisting of a chain-wheel and means for rotating it, a chain-wheel on the engine-shaft, a chain connecting the wheels, and a bracket for supporting the first-named chain-wheel and the steering-shaft and incasing the chain, substantially as described.

Signed by me in New York city, borough of Manhattan, this 26th day of March, 1900.

J. FRANK DURYEA.

Witnesses:
THOMAS EWING, Jr.,
SAMUEL W. BALCH.